US012257919B2

(12) United States Patent
Grunkemeyer et al.

(10) Patent No.: US 12,257,919 B2
(45) Date of Patent: Mar. 25, 2025

(54) MULTI-MODAL CONTROL PLANE FOR DEMAND FLEXIBILITY AND ELECTRIC VEHICLE CHARGING

(71) Applicant: FlexCharging, Inc., Redmond, WA (US)

(72) Inventors: Brian Grunkemeyer, Redmond, WA (US); Ana Jamborcic, Redmond, WA (US)

(73) Assignee: FlexEnergi, LLC, Bainbridge Island, WA (US)

( * ) Notice: Subject to any disclaimer, the term of this patent is extended or adjusted under 35 U.S.C. 154(b) by 0 days.

(21) Appl. No.: 16/818,917

(22) Filed: Mar. 13, 2020

(65) Prior Publication Data

US 2021/0284040 A1  Sep. 16, 2021

(51) Int. Cl.
*B60L 53/64* (2019.01)
*B60L 53/62* (2019.01)
*B60L 53/66* (2019.01)
*B60L 53/68* (2019.01)
*H02J 7/00* (2006.01)

(52) U.S. Cl.
CPC .............. *B60L 53/64* (2019.02); *B60L 53/62* (2019.02); *B60L 53/66* (2019.02); *B60L 53/68* (2019.02); *H02J 7/00034* (2020.01); *H02J 7/0071* (2020.01); *B60L 2240/72* (2013.01); *H02J 2310/14* (2020.01)

(58) Field of Classification Search
None
See application file for complete search history.

(56) References Cited

U.S. PATENT DOCUMENTS

| 9,104,537 | B1* | 8/2015 | Penilla | G06Q 30/0643 |
| 2010/0082277 | A1* | 4/2010 | Ballard | B60L 53/50 |
| | | | | 701/22 |
| 2011/0204720 | A1* | 8/2011 | Ruiz | H02J 3/322 |
| | | | | 307/66 |
| 2013/0166081 | A1* | 6/2013 | Sanders | G05B 11/01 |
| | | | | 700/286 |
| 2016/0144728 | A1* | 5/2016 | Harper | B60L 53/67 |
| | | | | 320/109 |
| 2017/0358041 | A1* | 12/2017 | Forbes, Jr. | H04L 69/325 |
| 2020/0244071 | A1* | 7/2020 | Smith | H02J 3/38 |

* cited by examiner

*Primary Examiner* — David V Henze-Gongola
(74) *Attorney, Agent, or Firm* — Seed IP Law Group LLP (57) ABSTRACT

A system for providing a multi-modal control plane for device energy consumption and charging is disclosed. The system includes a plurality of devices each having a charging mechanism in selective electrical communication with an energy provider which supplies a charge to each of the plurality of devices via the charging mechanism. One or more reinterpretation layers translate the information received from the plurality of devices. A control plane receives the information from the plurality of devices and transmits the information to an aggregation service to collect the plurality of information, interpret the plurality of information, and to control and plan output of energy from the energy provider.

20 Claims, 5 Drawing Sheets

MULTI-MODAL CONTROL PLANE FOR DEMAND FLEXIBILITY AND ELECTRIC VEHICLE CHARGING

TECHNICAL FIELD

The present disclosure relates generally to dynamic electric device power supply and charging systems.

BACKGROUND

Many electronic devices utilize power, but not necessarily continuously. Many such devices only require power at a particular time. As such, the power loading requirements of these devices may be time-shiftable. These power time-shiftable devices include, but are not limited to: electric vehicles, electric water heaters, dishwashers, air conditioners, clothes washers, dryers, and energy storage devices. The energy usage of these devices (either charging or their normal duty cycle) can be delayed to an optimal time of the day based on current conditions of the power grid within reasonable bounds set by the operator. This optimal time of day can be determined by the price or environmental attributes of electricity usage at that hour, such as the $CO_2$ emitted to produce the power. Additionally, residential and commercial batteries exist that can be controlled to charge or discharge depending on the grid or microgrid needs, as well as the owner's economic interests.

These power time-shiftable devices should ideally be integrated into the electric grid with two-way communication to respect the device operator's requirements while also providing some benefits to utilities. Utilities have several high-level approaches for controlling an electric load to minimize the peak capacity impacts and prices, such as demand response, direct load control, time-of-use rate schedules, critical peak pricing, and demand flexibility. In these scenarios, utilities can realize lower total costs by aggregating devices from multiple customers and treating them as a general platform. In theory, a utility or a device aggregator can control many power time-shiftable devices in a utility's service territory, providing demand flexibility in addition to demand response.

The owner-operator of these devices can set certain reasonable bounds on when they need the device to charge or complete its normal duty cycle. Frequently a device like a dishwasher is filled after dinner, but the clean dishes are not needed until the following morning. Similarly, an electric vehicle is driven home after work and does not need to be fully charged until the following morning, depending on the driver's schedule. This long downtime coincides with low utilization of the electric grid, meaning operating the device in the middle of the night generally leads to lower costs and in many places, lower emissions from power generation. Notably, the owner's requirements, such as an electric car needing a minimum level of charge to ensure it is available for emergencies, still should be taken into account.

BRIEF SUMMARY

This summary is provided to introduce a variety of concepts in a simplified form that are further disclosed in the detailed description of the embodiments. This summary is not intended to identify key or essential inventive concepts of the claimed subject matter, nor is it intended for determining the scope of the claimed subject matter.

The embodiments disclosed herein relate to a system for providing a multi-modal control plane for device energy consumption and charging. The system is comprised of a plurality of devices in communication with an application programming interface, each having a charging mechanism in selective electrical communication with an energy provider to supply a charge to each of the plurality of devices via the charging mechanism. One or more reinterpretation layers to translate the plurality of information returned from the application programming interface. A control plane receives a plurality of information from the plurality of devices and transmits the information to an aggregation service to collect the plurality of information, interpret the plurality of information, and to control and plan output of energy from the energy provider.

The embodiments provide a means for monitoring and controlling power output to electric vehicles, appliances, and energy storage devices, as well as providing multiple control pathways for different types of devices, or potentially even the same device. It also provides mechanisms for device operators to override delayed charging through interacting with the device itself or by using a mobile application or computer program. The system may be utilized to monitor user habits to infer the user's intent for the operational functions of the system.

In one aspect, the plurality of devices are comprised of one or more electric vehicles and one or more electrical appliances.

In one aspect, the plurality of information collected and interpreted by the aggregation service is comprised of at least one of the following: state-of-charge data, location data, desired state-of-charge data, charging and discharging state data, charging power data, time left to charge data, temperature data, and charging attributes, wherein the aggregation service is configured to interpret a plurality of user characteristics.

In one aspect, the plurality of user characteristics is comprised of at least one of the following: polling frequency data, user preferences data, and scheduling algorithm data.

In one aspect, the reinterpretation layers are in communication with at least one of the following: an OEM (Original Equipment Manufacturer) cloud service, an EVSE (Electric Vehicle Supply Equipment), an AMI (Advanced Metering Infrastructure), and a smart switch to operate the power input for each of the plurality of devices.

In one aspect, a control system is in operable communication with the control plane. The control system is utilized by a user to perform at least one of the following functions: starting charging, stopping charging, starting energy discharge, stopping energy discharge.

In one aspect, the control system is defined as one or more of the following: a smart switch, a remote-control interface, and a mobile application interface.

In one aspect, the user utilizes the control interface to transmit an output signal to at least one of the plurality of devices.

The system may be scaled to integrate many devices of different types from a variety of manufacturers. A partitioning scheme may be employed for segregating devices into geographic areas, utilities, hashing based on vehicle identification numbers, or similar partitioning schemes.

Each user interaction with the system is monitored by the control plane. This may include a desired state-of-charge for the user at a given time, when the user plugs the vehicle in for charging, or when the user manually overrides various automated or semi-automated functionalities of the system.

BRIEF DESCRIPTION OF THE DRAWINGS

A complete understanding of the present embodiments and the improvements and features thereof will be more readily understood by reference to the following detailed description when considered in conjunction with the accompanying drawings wherein.

DETAILED DESCRIPTION

Each of the features and teachings disclosed herein can be utilized separately or in conjunction with other features and teachings. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed in the detailed description may not be necessary to practice the teachings in the broadest sense, and are instead taught merely to describe particularly representative examples of the present teachings.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Well-known circuits, structures, and techniques have not been shown in detail in order not to obscure the understanding of this description. Those of ordinary skill in the art, with the included descriptions, will be able to implement appropriate functionality without undue experimentation.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Reference throughout this specification to "one implementation," "an implementation," "one embodiment," "an embodiment," means that particular features, structures, or characteristics may be combined in any suitable manner in one or more implementations or embodiments. As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

As used herein the term "device" refers to any household appliance, vehicle, utility, tool or other items which operate via electrical power gained from a power/electrical grid, solar panel, or energy storage device. As used herein, the term "user" refers to anyone interacting with the devices of the system disclosed herein. The user may operate the devices, turn ON or OFF the charging functions of the devices, and override the system functionalities described herein.

In general, the system described in the various embodiments provide a system which enables users of a device and energy providers which supply the energy which permits operation of the device a means for analyzing and optimizing energy usage. Energy optimization may be accomplished in various ways, such as by analyzing the user's habits as well as analyzing energy provider demand flexibility. This may be especially useful for energy providers that utilize a demand pricing scheme.

Electric utilities and device aggregation companies need a way to control the load from multiple types of devices, such as electric vehicles, water heaters, and air conditioners, as well as interact with energy storage devices like home or business battery systems. The embodiments described herein provide a system which describes a computer representation of various devices, enables data gathering from the devices, captures the device operator's habits to determine the operator's energy requirements, and provides a method to start or stop device operation (such as charging an electric vehicle).

The embodiments may enable future work around demand flexibility such as by collecting data from the system and mixing the data with a scheduler and rules from a power provider to design a demand flexibility program to lower peak load, integrate variable renewable energy resources, manage energy storage devices, avoid distribution grid upgrades, and save money. Demand flexibility lowers peak load by letting utilities dispatch load at times with more idle generating capacity, meaning they do not need to build new power plants as load increases. Variable renewable resources like wind, solar and occasionally even hydroelectric power are occasionally curtailed due to excess supply and insufficient demand. Demand flexibility will enable loads to be dispatched concurrently with these variable resources, to soak up excess power. This will help prevent power prices from going negative, and provide benefits to the operators of the renewable power plants (such as generating some revenue in the market, as well as producing production tax credits). Energy storage devices located in a home or in a microgrid should also be managed in a priority order. In one embodiment, consumption of local renewable generated electricity should be prioritized. Perhaps it should be consumed first in end-use devices, then stored in car batteries, then used to recharge energy storage devices, then sold to the larger grid. A priority order like this will avoid extra AC/DC conversions or converting energy from electricity to stored potential chemical energy (and vice versa), each of which loses approximately 8% energy with today's electronics. Demand flexibility can be used to minimize or offset distribution grid upgrades, such as larger transformers or upgraded feeders, by spreading out load away from peak times. Further, data gathered from a demand flexibility system can be collated then provided to transit planners or entities analyzing electric vehicle "EV" adoption, and utility energy and peak capacity needs, as well as identifying potential EV charging sites.

Figure 1:
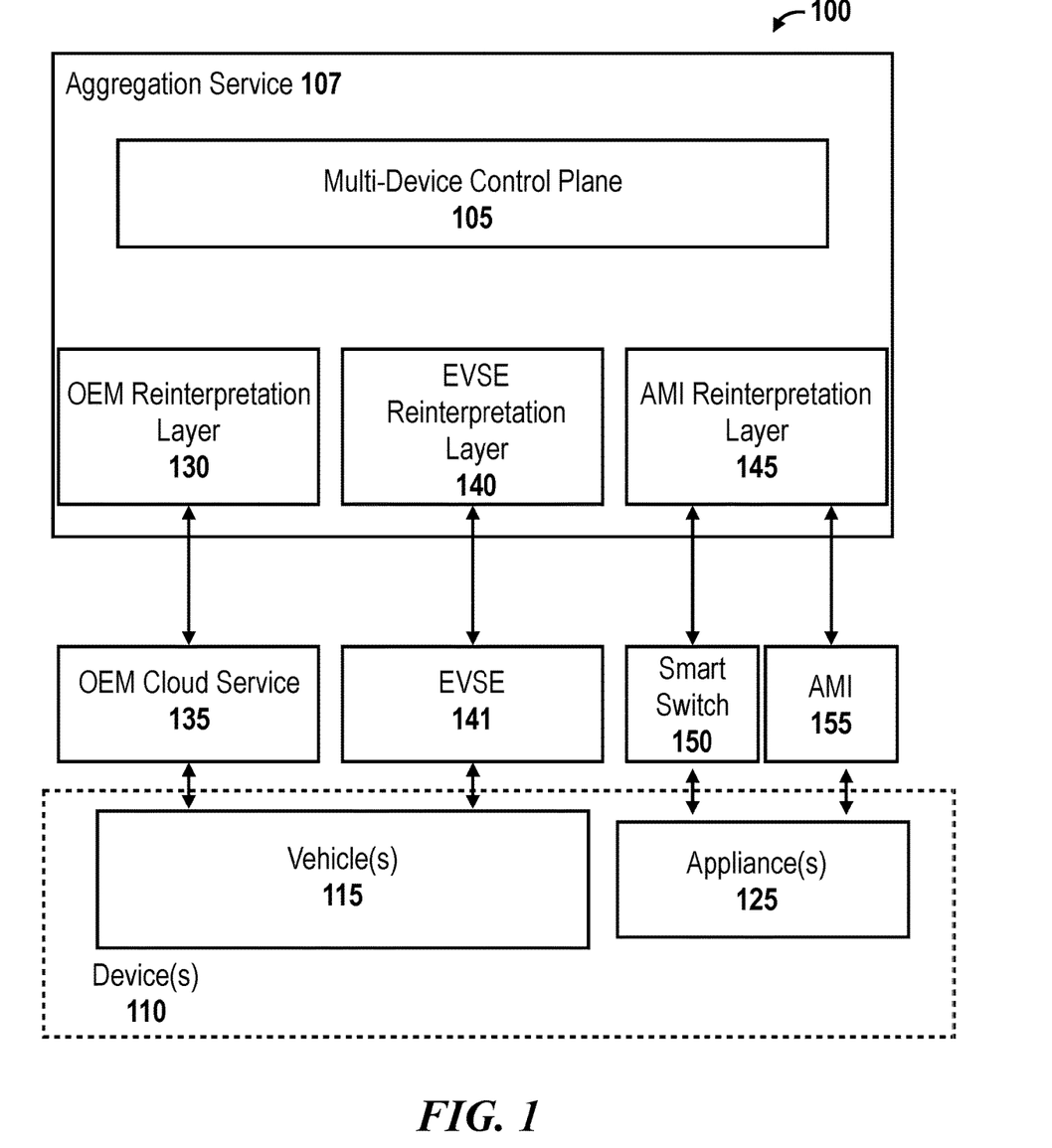
FIG. 1 illustrates an exemplary block diagram of the multi-modal control plane system, according to some embodiments.

FIG. 1 illustrates an exemplary block diagram of a multi-modal control plane system 100 (hereinafter "the system"). A multi-device control plane 105 of an aggregation service 107 is in communication with one or more devices 110 to control the output of electricity from a utility.

The devices 110 may include one or more electric vehicles 115 and/or one or more appliances 125. The devices may interface with the aggregation service via one or more device reinterpretation layers such as an original equipment manufacturer ("OEM") reinterpretation layer 130 to communicate with the OEM's cloud service 135 utilized by the electric vehicle 115 manufacturer. Similarly, an electric vehicle supply equipment ("EVSE") reinterpretation layer 140 is configured to communicate with the EVSE 141 of the vehicle 115. Each appliance 125 may utilize an advanced metering infrastructure ("AMI") reinterpretation layer 145 to communicate the appliance via a smart switch 150 or appliance AMI 155.

Device Reinterpretation Layer

Each control pathway may require a device-specific data reinterpretation layer to correct, augment, or translate information returned via the application programming interface ("API"). Commonly, a platform will have one representation of a device, with an optional class for each specific type of device which requires some often-trivial translation from API output into a data structure in memory. However, the quality of the data source for the API's may be lacking or inconsistent, or the data may be only partially correct. For this, it is useful to reinterpret the data coming from the underlying API.

As a non-limiting example, an electric car manufacturer's API provides information about charging power in kW and also provide the voltage and amperage rate the vehicle is charging at. When charging at direct current ("DC") fast chargers, one automaker's reported charging power is 0 kW, but the automaker accurately reports the voltage and amperage. Power is the product of voltage and amperage; a simple reinterpretation layer can fix this inconsistency. However, the need to provide this layer is an important characteristic of the system.

EVSE Control Paths

Electric vehicle supply equipment in the current art often provides a mechanism for controlling when an electric vehicle charges. The electric vehicle supply equipment may use manufacturer-specific protocols. However, most of them support open charge point protocol ("OCPP"). OCPP was designed for a range of uses, such as authorization and billing; however, for purposes of building a control plane, it can function as a network-connected on/off switch. Similarly, the protocol could be used to slow down charging, to avoid or minimize demand charges, or to otherwise avoid overloading circuits within a home.

EVSE may additionally support SAE 15118, a standard under development for controlling EVSE and obtaining data like state-of-charge information which will enable a more useful control pathway between the electric vehicle and the EVSE. Then standards like OCPP (or a future revision to the standard) can send state-of-charge information and similar attributes to a cloud-based control plane for aggregation, and a rich level of control and planning. Similarly, open vehicle grid integration protocols enable similar data sharing and control with an aggregator.

The embodiments provided herein relate to a platform to integrate them all together in a multi-vendor, multi-modal control plane for integrating all of these standards together into one uniform representation of various devices, capturing their unique attributes and limitations, while simultaneously enabling them all to be aggregated together, monitored, and controlled.

Figure 2:
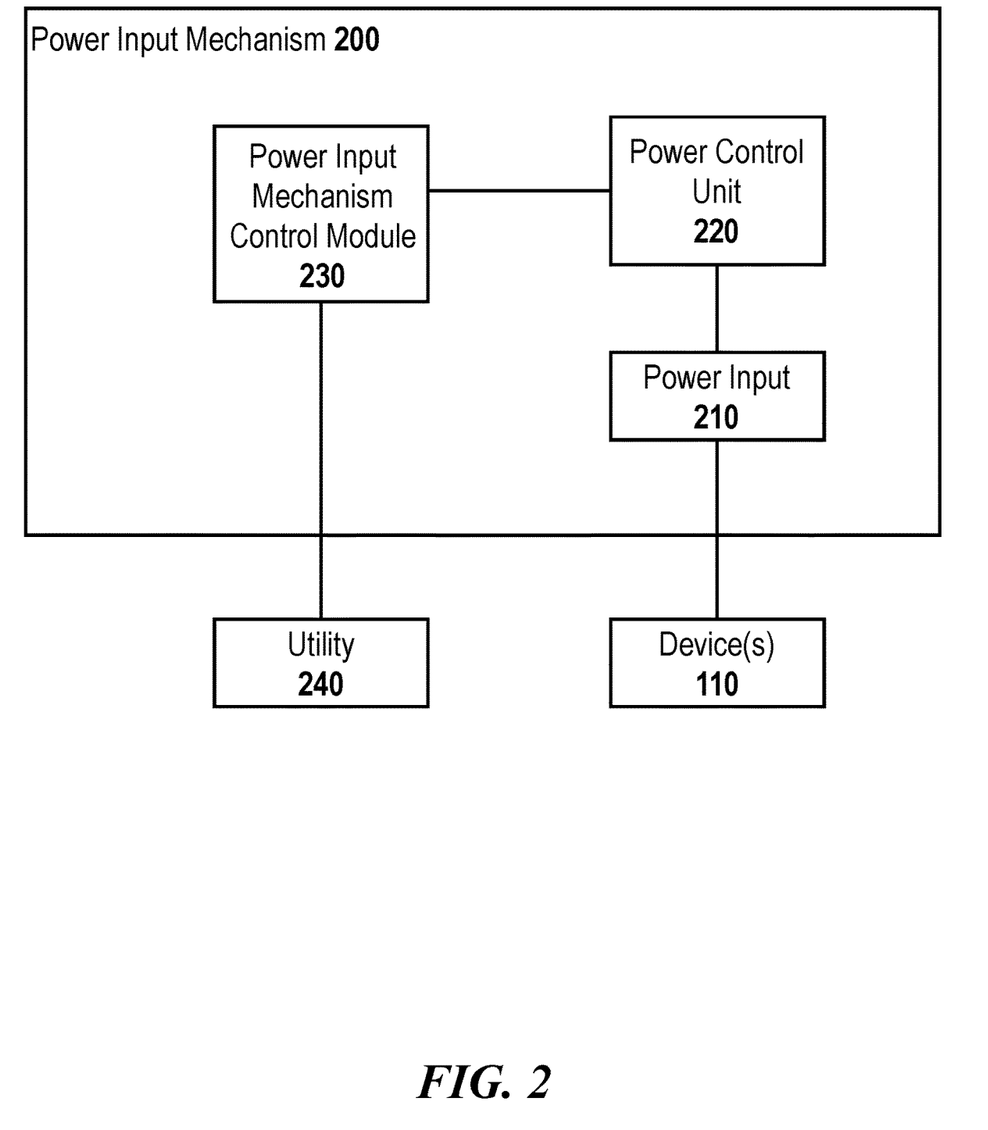
FIG. 2 illustrates a block diagram of the power input mechanism, according to some embodiments.

FIG. 2 illustrates an exemplary block diagram of the power input mechanism 200 in electric communication with each device 110. The power input mechanism 200 includes any power input device for an electric vehicle or appliance which may transmit an electrical current during the use of the device and/or for charging of the device. The power input mechanism 200 includes a power input 210, which interfaces with the device 110 to supply power thereto. The power input receives an electrical current from a power control unit 220 which may operate via a power input mechanism control module 230 to permit the system to alter electrical current distribution received from the utility 240 to one or more of the devices 110.

The electric vehicle includes the onboard charging system that includes a charger component that supplies the power to the battery and any other equipment required to condition and transfers energy from the constant frequency, constant supply voltage supply network to the direct current, variable voltage battery bus for the purposes of charging the battery.

In some embodiments, the power input mechanism 200 may be a charging station for the electric vehicle (e.g., electric battery powered vehicles, gasoline/electric battery powered vehicle hybrids, etc.) which may be provided in a private residence, designated charging station (which may be similar to a gas station), near public or private parking spaces, at park-and-ride facilities, etc. The charging station may be controlled by governments, businesses, utilities, organizations, residential customers, or other entities.

The charging station is comprised of one or more charging ports (e.g., power inputs), each of which may be capable of connecting to the vehicle.

In some embodiments, the charging station may be in communication with a demand response module that enables a utility 240 or a user to cause a demand response load control signal to be transmitted to the charging station or other power input of the various devices in communication with the system. For example, due to a strain on the power grid, the utility 240 may determine to reduce the load of the charging stations on the power grid to a certain percentage (e.g., reduce the load to 80%). The utility 240 uses the demand response module to cause a message to be sent to the charging stations on the power grid to reduce their load to at least 80%. The demand response module may also be used to select certain charging stations in which to effect a demand response event. The demand response module may be configured to automatically transmit a signal to effect a demand response event.

In some embodiments, users may opt-in, opt-out, or selectively opt to be affected by the demand response events, transmitted by the demand response module. Similarly, other power-limiting events may be selectively engaged in by the user.

In some embodiments, a power limiting event, such as a demand response event, may terminate in various ways. In one example, the power limiting event may exist for a defined period of time (e.g., one hour) wherein upon the expiration thereof, the power limit is removed.

EV Charging Cable Inline Switch

In some embodiments, a potential control point for the EV is an Internet-connected inline switch, an adapter between the car and the car's charging cable. Simple implementations can serve as an on/off switch, while more advanced ones can use protocols like SAE 15118 to get information from the car and share it with a cloud service for aggregation, control, and demand response events.

Supplemental Telematics Unit Control Path

For vehicles without connected car support, a supplemental vehicle telematics unit can be plugged into the onboard diagnostics ("OBD") port such as the OBD2 port. The supplemental vehicle telematics unit interacts with the vehicle controller area network ("CAN") bus.

Additional Control Pathways

Other devices were created to use a different information network than the Internet. The protocol AMI is used by electric utilities to both read meters remotely and control AMI-capable devices such as those used by smart home water heaters.

Smart home thermostats (such as NEST®) are another example of a smart device that is remotely controllable. It can be controlled remotely via a smartphone app, similar to cars. Other thermostats may react based on pricing information or the presence of "critical peak pricing" or "high demand periods." These would be sent via the Internet to devices, and they would be pre-configured to shut off or operate with a larger range of allowed temperatures.

In some embodiments, Internet protocol packets may be sent over power lines.

Data Probing from the Device

A device may transmit data describing its global positioning system ("GPS") location, state of charge, desired state of charge, charging and discharging state, charging power, time left to charge, temperature, charging attributes, other operational characteristics.

Data probing may include the vehicle identification number, an assigned name for the device (vehicle or appliance), a battery capacity and battery range, a state-of-charge, a desired state-of-charge, a charging state, a location, a charger pilot current, a charger actual current, a charger voltage, a charger power, a time until full charge of the device, a charger phases or phases, a charger status (such as if the charger is using a supercharger or DC fast charger), scheduled charging lists, scheduled charging start times associated with the list, speed, odometer data, temperatures, and if smart preconditioning is enabled.

In some embodiments, data collected from the device may include, but is not limited to polling frequency, data storage, interpreting and inferring user preferences, scheduling algorithms, integration with utilities, and support for protocols like OpenADR which use the vertical solution built on top of the control plane.

Controlling the Device

The control plane may be provided with a control mechanism, such as an associated mobile application or other remote control interface device to start and stop charging, start and stop discharging energy (for energy storage), and turn ON/OFF air conditioner/heater (both for vehicles as well as thermostats). In one example, turning on an HVAC system in a vehicle may be necessary to receive and analyze temperature details.

Control pathways may enable arbitrary complex functionalities, such as unlocking doors, starting a vehicle, summoning the car to a GPS location, or starting software upgrades.

Figure 3:
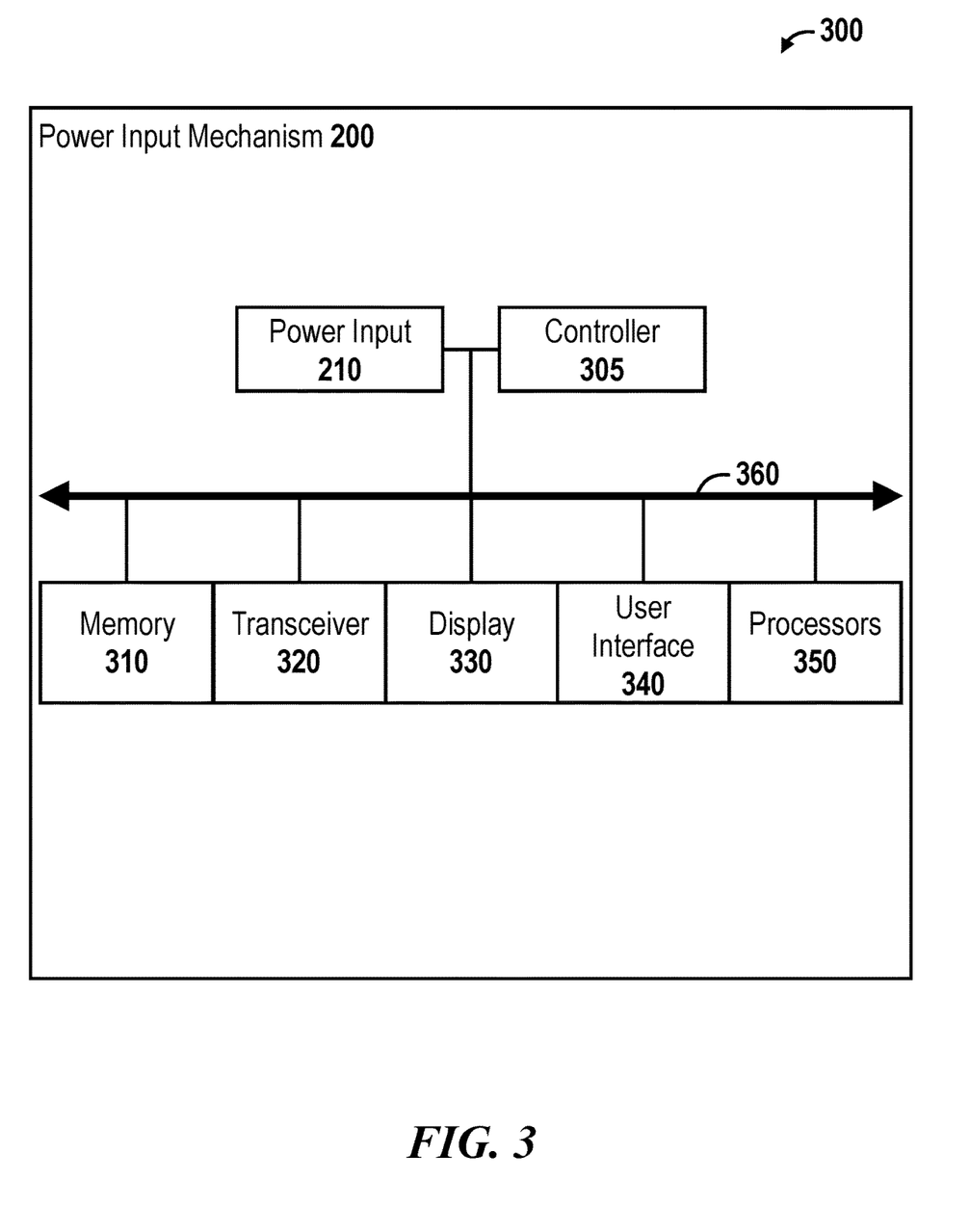
FIG. 3 illustrates a block diagram of the control system, according to some embodiments.

FIG. 3 illustrates an exemplary control system 300 is illustrated which includes the power input mechanism 200 receiving, via a power line, an electrical current from the utility to operate a controller 305 to affect the power input 210. A memory 310, transceivers 320, display 330, user interface 340, and processors 350 may be in communication with the controller via bus(es) 360. The controller enables the user to affect the power supply to the devices in the system.

In some embodiments, the controller 305 is in communication with an energy meter to measure the amount of electricity flowing through the power inputs. The energy meter may measure the current flow or power draw.

The transceivers 320 transmit and receive messages to and from a server in communication with the system. The transceivers may operate to transmit charging session data, usage data, user data, or similar information.

The display unit is used to display messages, via the user interface to the user. The display 330 may be provided as a touch screen display to enable the user to selectively input commands to affect the system. The user interface enables users to interact in a variety of ways with the system, as described in the various embodiments herein.

The processing system may retrieve functions from the memory 310 and execute the instructions to perform various operations described herein.

As described herein, instructions may refer to specific configurations of hardware such as application specific integrated circuits (ASICs) configured to perform certain operations or having a predetermined functionality or software instructions stored in memory 310 embodied in a non-transitory computer-readable medium. Thus, the techniques shown in the figures can be implemented using code and data stored and executed on one or more electronic devices (e.g., a server, a charging station, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the system or method may be implemented using different combinations of software, firmware, and/or hardware.

Capturing Operator Interactions with the Device

To accurately represent user intent, all human interactions with a device need to be monitored such as, for example, did the vehicle's desired state-of-charge change, or, did a driver manually start charging the vehicle? These provide applications built on top of the control plane with extra clues about the driver's intent to operate the device and the driver's habits which can be interpreted to optimize charging and usage of the various devices connected to the system.

Devices such as air conditioners or water heaters may be controlled by the system and analyzed throughout their usage to interpret various user controls. For example, did the user adjust the set point for the device, or push a button indicating they were home or in need of the device. Further, did the device detect that users are home, either through a motion sensor, microphone, or some other monitoring device? The system may be provided with a plurality of microphones for monitoring purposes.

In some embodiments, the control plane also may provide a mobile app or web site to the user to enable them to opt out of smart charging, to charge now, or temporarily disable any load shifting for various times. In this manner, a user maintains full control over their device's availability during important days, such as preparing for a long road trip or hosting houseguests in a home. The signals from the mobile app would be made available to apps built on top of this control plane.

Figure 4:
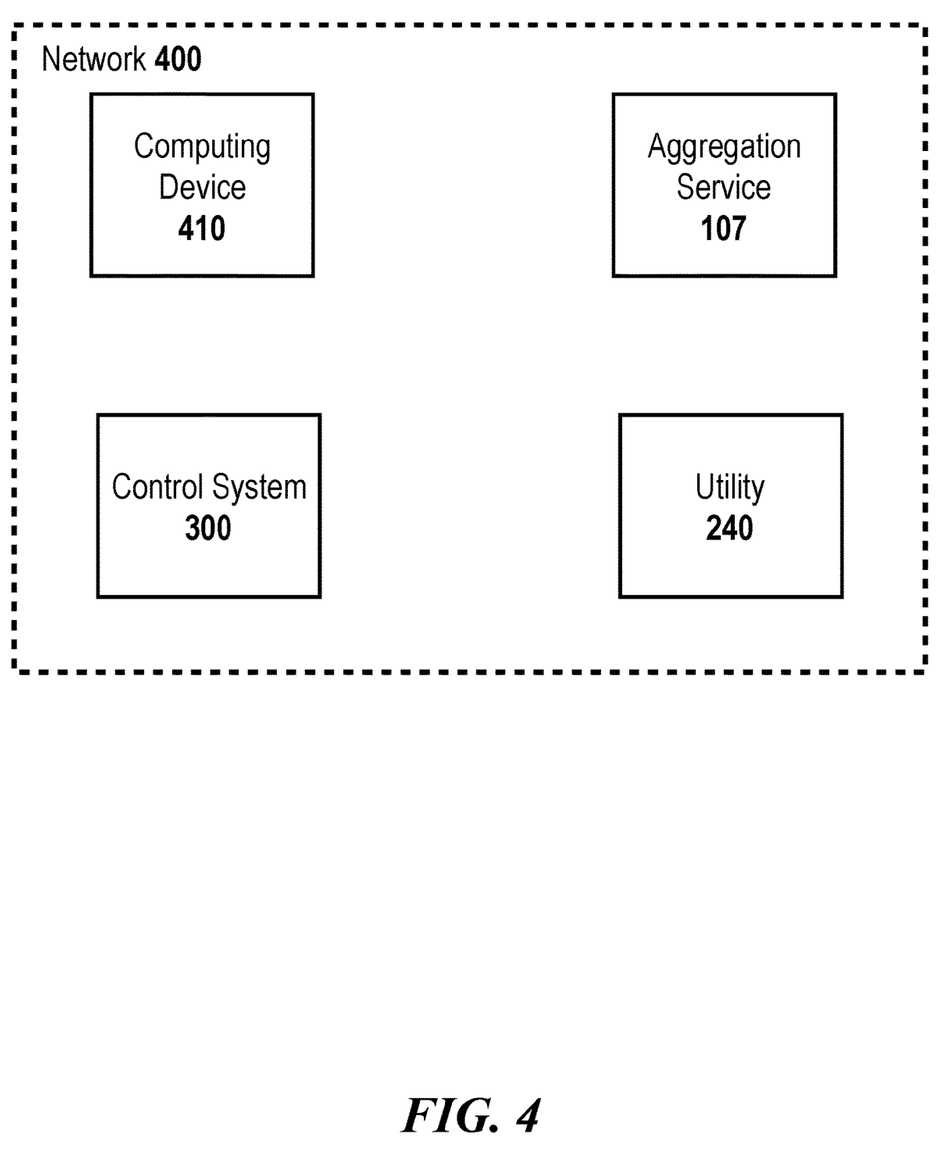
FIG. 4 illustrates an exemplary block diagram of the network and network components, according to some embodiments.

FIG. 4 illustrates an exemplary network infrastructure wherein a network 400 is in communication with the control system 300, the utility 240, a computing device 410, and the aggregation service 107. The network permits user data and device data to be transmitted to the aggregation service 107 for the various utilizations provided herein. Data may then be stored in one or more databases to infer user habits, user intentions, utility habits, and utility intentions as described herein.

Figure 5:
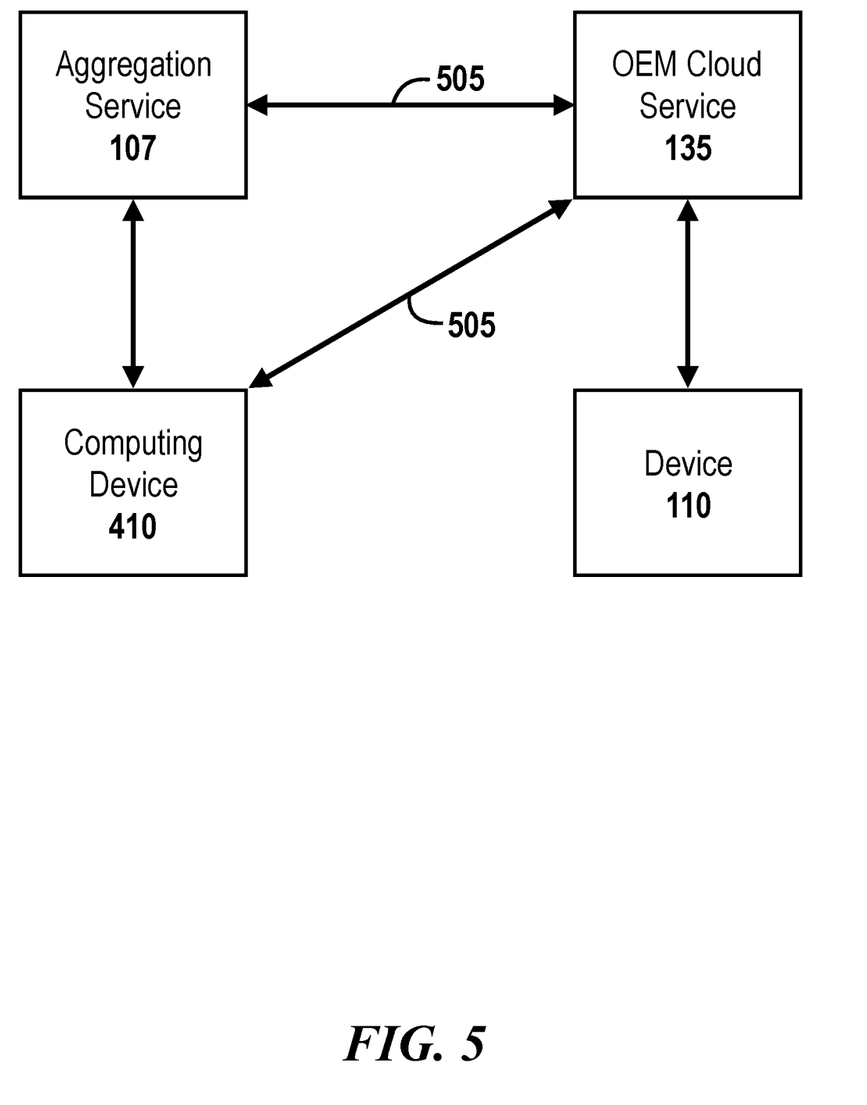
FIG. 5 illustrates a block diagram of the device manufacturer control path, according to some embodiments.

FIG. 5 illustrates an exemplary device manufacturer control path comprised of the aggregation service 107 in communication with the OEM cloud service 135 via an OEM API 505. Similarly, the OEM cloud service 135 may communicate with the computing device 410 via the OEM API 505. The OEM cloud service 135 communicates with the device 110 to transmit information to the aggregation service 107 and the computing device 410.

Server Scope

The representation of the platform will be stored on one or more computer servers, or in a cloud database. The data represented by a set of devices may be partitioned in ways, such as by utility balancing authority, ISO territory, a state/province, a country, or an individual microgrid.

Ancillary Data Sources

In some embodiments, the control plane for vehicles may utilize auxiliary web services to augment information. For example, each electric vehicle may provide a GPS location, and applications built on top of the control plane may need to know the time at that specific location. As a result, the control plane can optionally depend on external services such as a time zone API to map GPS locations to time zones. Optionally, caching that data locally and/or some simple heuristics to catch most cases without using the time zone API are optimizations that can lower the total number of calls to an external time zone API, thus lowering operational costs for the control plane.

In some embodiments, a control plane or software built on top of it may utilize other web services to obtain information like weather forecasts, power supply and demand forecasts, power price forecasts, $CO_2$ emissions data for power generation, marginal $CO_2$ emissions forecasts, and other relevant operational information. In one example, at least one mobile application app built on top of the control plane is utilized to forecast power outages using data gathered from weather sources, such as wind storm or extreme weather event forecasts.

When logic is implemented as software and stored in memory, logic or information can be stored on any processor readable medium for use by or in connection with any processor related system or method. In the context of this disclosure, a memory is a processor readable medium that is an electronic, magnetic, optical, or other physical device or means that contains or stores a computer and/or processor program. Logic and/or the information can be embodied in any processor readable medium for use by or in connection with an instruction execution system, apparatus, or device, such as a computer based system, processor containing system, or other system that can fetch the instructions from the instruction execution system, apparatus, or device and execute the instructions associated with logic and/or information.

In the context of this specification, a "non transitory processor readable medium" can be any element that can store the program associated with logic and/or information for use by or in connection with the instruction execution system, apparatus, and/or device. The processor readable medium can be, for example, but is not limited to, an electronic, magnetic, optical, electromagnetic, infrared, or semiconductor system, apparatus or device. More specific examples (a non exhaustive list) of the computer readable medium would include the following: a portable computer diskette (magnetic, compact flash card, secure digital, or the like), a random access memory (RAM), a read only memory (ROM), an erasable programmable read only memory (EPROM, EEPROM, or Flash memory), a portable compact disc read only memory (CDROM), digital tape, and other non transitory media.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim.

Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present disclosure is not limited to what has been particularly shown and described hereinabove. A variety of modifications and variations are possible in light of the above teachings without departing from the following claims.

What is claimed is:

1. A system for providing a multi-modal control plane for device energy consumption, charging, data collection, and monitoring, the system comprising:
   a plurality of devices in communication with an application programming interface, wherein the plurality of devices are comprised of one or more electric vehicles and one or more electrical appliances, each of the plurality of devices having a power input mechanism in selective electrical communication with a utility, the utility supplying power to each of the plurality of devices via the power input mechanism;
   one or more reinterpretation layers that translates a plurality of information returned from the application programming interface; and
   a control plane that receives information from the plurality of devices, transmits the information to an aggregation service, interprets the information, and controls and plans output of energy from the utility,
   wherein user interactions with the system are monitored by the control plane, the user interactions including a desired state-of-charge of a device at a given time, a time when the user plugs in an electric vehicle for charging, and the user manually overriding delayed charging by the system of an electronic device and maintaining full control over the electronic device's availability, and wherein the system monitors the user's habits of interactions with the system, infers the user's intent for operational functions of the system, and optimizes charging and usage of the plurality of devices connected to the system.

2. The system of claim 1, wherein the plurality of devices are further comprised of one or more renewable energy resource devices, one or more energy storage devices, or both.

3. The system of claim 1, wherein the plurality of information collected and interpreted by the aggregation service includes one or more of: state-of-charge data, location data, desired state-of-charge data, charging and discharging state data, charging power data, time left to charge data, temperature data, and charging attributes.

4. The system of claim 3, wherein the plurality of user characteristics is comprised of at least one of the following: polling frequency data, user preferences data, and scheduling algorithm data.

5. The system of claim 1, further comprising a control system in operable communication with the control plane.

6. The system of claim 5, wherein the control system is utilized by a user, an energy provider, and the aggregation service to perform at least one of the following functions: starting charging, stopping charging, starting energy discharge, stopping energy discharge.

7. The system of claim 6, wherein the control system is defined as one or more of the following: a smart switch, a remote-control interface, and a mobile application interface.

8. The system of claim 7, wherein the user utilizes a control interface to transmit an output signal to at least one of the plurality of devices.

9. The system of claim 1, wherein at least one of the plurality of devices is comprised of a telematics device in communication with the control plane.

10. A system for providing a multi-modal control plane for device energy consumption, charging, data collection, and monitoring, the system comprising:
    a plurality of devices in communication with an application programming interface providing a user with a control system controlling power to each of the plurality of devices, wherein the plurality of devices are comprised of one or more electric vehicles and one or more electrical appliances, each of the plurality of devices in communication with a power input mechanism in selective electrical communication with a utility;
    one or more reinterpretation layers that translates a plurality of information returned from the application programming interface;
    a control plane that receives information from the plurality of devices, transmits the information to an aggregation service, interprets the information, and controls and plans output of energy from the utility, wherein the control plane controls an electric load from multiple home electric devices and
    a power input mechanism control module that controls power to the plurality of devices, the power input mechanism control module in operable communication with the user and the utility to permit adjustment of the power to the plurality of devices,
    wherein user interactions with the system are monitored by the control plane, the user interactions including a desired state-of-charge of a device at a given time, a time when the user plugs in an electric vehicle for charging, and the user manually overriding delayed charging by the system of an electronic device and maintaining full control over the electronic device's availability, wherein the system monitors the user's habits of interactions with the system and infers the user's intent for operational functions of the system, and wherein the user interactions are monitored using monitoring devices that include motion sensors and microphones.

11. The system of claim 10, wherein the plurality of devices are further comprised of one or more renewable energy resource devices, one or more energy storage devices, or both.

12. The system of claim 11, wherein the power input mechanism is a charging station.

13. The system of claim 12, further comprising a network of charging stations controllable via a open charge point protocol.

14. The system of claim 10, wherein the plurality of information collected and interpreted by the aggregation service is comprised of at least one of the following: state-of-charge data, location data, desired state-of-charge data, charging and discharging state data, charging power data, time left to charge data, temperature data, and charging attributes, wherein the aggregation service is configured to interpret a plurality of user characteristics.

15. The system of claim 14, wherein the plurality of user characteristics is comprised of at least one of the following: polling frequency data, user preferences data, and scheduling algorithm data.

16. The system of claim 15, wherein the control system is utilized by the user or the aggregation service to perform at least one of the following functions: starting charging, stopping charging, starting energy discharge, and stopping energy discharge.

17. The system of claim 16, wherein the control system is defined as one or more of the following: a smart switch, a remote-control interface, and a mobile application interface.

18. The system of claim 10, wherein at least one of the plurality of devices is comprised of a telematics device in communication with the control plane.

19. The system of claim 10, wherein the power input mechanism control module is in communication with the utility to affect power distribution to the plurality of devices, wherein the communication with the utility is direct or indirect via the aggregation service.

20. A system for providing a multi-modal control plane for device energy consumption, charging, data collection, and monitoring, the system comprising:

a plurality of devices in communication with an application programming interface providing a user with a control system controlling power to each of the plurality of devices, each of the plurality of devices in communication with a power input mechanism in selective electrical communication with a utility via a power input mechanism control module configured to selectively distribute power received from the utility to the plurality of devices, the power input mechanism control module in operable communication with the user and the utility;

one or more reinterpretation layers that translates a plurality of information returned from the application programming interface, the reinterpretation layers in communication with at least one of the following: an OEM cloud service, an EVSE, an AMI, and a smart switch; and a control plane that receives information from the plurality of devices, transmits the information to an aggregation service, interprets the information, and controls and plans output of energy from the utility, wherein user interactions with the system are monitored by the control plane, the user interactions including a desired state-of-charge of a device at a given time, a time when the user plugs in an electric vehicle for charging, set point adjustments for the plurality of devices, button pushes indicating the user is home, button pushes indicating the user needs of the plurality of devices, and the user manually overriding delayed charging by the system of an electronic device and maintaining full control over the electronic device's availability, and wherein the system monitors the user's habits of interactions with the system, infers the user's intent for operational functions of the system, and optimizes charging and usage of the plurality of devices connected to the system.

* * * * *